United States Patent [19]
Kato et al.

[11] Patent Number: 6,056,814
[45] Date of Patent: May 2, 2000

[54] PIGMENT COMPOSITION AND AQUEOUS PIGMENT DISPERSION PREPARED THEREFROM

[75] Inventors: Mikiya Kato; Ataru Chiba; Junichi Tsuchida, all of Tokyo, Japan

[73] Assignee: Toyo Ink Mfg. Co., Ltd., Tokyo, Japan

[21] Appl. No.: 09/192,562

[22] Filed: Nov. 17, 1998

[30] Foreign Application Priority Data

Dec. 8, 1997 [JP] Japan ................... P6-336701

[51] Int. Cl.⁷ .............. C09B 47/04; C08K 5/34; C08K 5/00
[52] U.S. Cl. ............ 106/412; 106/410; 106/493; 106/494; 106/495; 106/496; 106/497; 106/498; 106/499
[58] Field of Search ........... 106/412, 499, 106/493, 494, 495, 496, 497, 498; 540/122

[56] References Cited

U.S. PATENT DOCUMENTS

| | | | |
|---|---|---|---|
| 4,104,277 | 8/1978 | Langley | 540/141 |
| 4,298,526 | 11/1981 | Sappok et al. | 540/122 |
| 4,371,642 | 2/1983 | Jaffe | 524/88 |
| 4,431,806 | 2/1984 | Spietschka et al. | 546/37 |
| 4,478,968 | 10/1984 | Jaffe | 524/88 |
| 4,548,968 | 10/1985 | Jaffe | 524/88 |
| 5,275,653 | 1/1994 | Dietz et al. | 106/498 |
| 5,964,929 | 10/1999 | Langley et al. | 106/31.66 |

OTHER PUBLICATIONS

Abstract of JP 55075453, Jun. 1980.
Abstract of JP 09188845, Jul. 1997.
Abstract of JP 092217019, Feb. 1996.

*Primary Examiner*—Anthony Green
*Attorney, Agent, or Firm*—Oblon, Spivak, McClelland, Maier & Neustadt, P.C.

[57] ABSTRACT

The present invention provide a pigment composition and a method for producing same at low cost, which has the same or more excellent quality compared with those produced by a salt milling process which has been commonly used. The pigment composition is produced by dry-milling a pigment in the presence of a surfactant and a water-soluble resin, said surfactant and said water-soluble resin being contained in amounts of 1 to 20% by weight and 2 to 50% by weight respectively based on an amount of the pigment. The pigment composition according to the present invention is readily dispersed into an aqueous system to obtain an aqueous pigment dispersion.

26 Claims, No Drawings

PIGMENT COMPOSITION AND AQUEOUS PIGMENT DISPERSION PREPARED THEREFROM

BACKGROUND OF THE INVENTION

1. Field of the Invention

The present invention relates to a pigment composition for preparing an aqueous pigment dispersion such as aqueous paints, water-based ink, such as those for textile printing, automobile painting, making color filters, and ink jet printing. The present invention also relates to an aqueous pigment dispersion prepared from the pigment composition.

2. Description of Prior Art

Conventional methods for preparing pigments to produce aqueous dispersions thereof (generally referred to as "pigmentation") include so-called salt milling process (hereinafter referred to as "solvent salt milling method"). In this method, crude pigments are milled in a ball mill or a kneader in the presence of an inorganic salt and other adjuvants as needed for a long period of time. Consecutively, the inorganic salt and these adjuvants are removed to prepare fine particles of desired pigment. In order to prepare an aqueous pigment dispersion using the milled pigment particles, a disperser, e.g. a sand mill, is used to resolve the coagulated dry pigment into fine particles and simultaneously to disperse the pigment particles in an ink vehicle.

Such a conventional method requires considerable energy for the recovery of the inorganic salt and adjuvants and for the wastewater management of water used for the recovery. Large dispersion energy is also required in the step of dispersing the milled pigment particles in the ink vehicle to obtain the aqueous pigment dispersion.

To solve these problems, Japanese Patent Application Laid-Open No.S55-75453 discloses a method for producing a pigment composition. In this method, crude copper phthalocyanine is dry-milled in the presence of an acid, e.g. sulfuric acid and after that treated in a solvent. The treated pigment is then isolated to produce a pigment composition. However, the resulting composition for dispersion is composed of only a pigment since this method does not use any resin at all. Hence one cannot obtain directly from this pigment composition a pigment dispersion thereof in which resin is used as a vehicle. It is necessary to carry out a further dispersion step in the presence of a resin. The solvent treatment must also be carried out after the dry milling and it is also necessary to carry out an operation for the recovery of a waste solvent.

Japanese Patent Application Laid-Open No.H9-217019 proposes a method for producing a pigment composition, the method comprising a first step of dry-milling a crude pigment, a second step of adding a resin and an organic solvent to disperse the mixture mechanically, a third step of adding an acid to the dispersed substance to precipitate the resin onto the pigment, and a fourth step of reneutralizing by adding an alkali to the precipitate. This method requires considerable energy for the resin treatment, comprises many steps for production and is hence long and complicated.

Japanese Patent Application Laid-Open No.H9-188845 proposes a method for producing an ink concentrate by dry-milling a crude copper phthalocyanine together with a resin and an organic liquid and then kneading the resulting pigment composition in an ink solvent. This method requires a large amount of energy to obtain the ink concentrate by performing the kneading operation to the extent that the pigment composition is sufficiently dispersed.

SUMMARY OF THE INVENTION

The inventors of the present invention have succeeded with surprise to find a pigment composition which can be produced in a single step without using large amounts of water and solvent and can be readily dispersed into an aqueous system. An aqueous pigment dispersion can be easily produced by introducing the pigment composition into water containing an alkali and then stirring the mixture. This aqueous pigment dispersion is made into a coloring material such as an aqueous ink, which has excellent dispersibility, color strength, glossiness, and flow characteristics.

The present invention provides a pigment composition in a powder form produced by dry-milling a pigment in the presence of a surfactant and a water-soluble resin, said surfactant and said water-soluble resin being contained in amounts of 1 to 20% by weight and 2 to 50% by weight respectively based on an amount of the pigment.

Preferred surfactant is an aromatic compound to which an ethylene oxide is added.

The water-soluble resin preferably has an acid group and is soluble in water in the presence of an alkali.

Further preferably, the water-soluble resin is a solid resin.

The pigment may be a crude pigment.

The pigment is preferably a condensed polycyclic pigment such as the one comprising a copper phthalocyanine.

The pigment composition may be used for preparing an aqueous pigment dispersion.

From another aspect of the present invention, there is provided an aqueous pigment dispersion produced by dispersing the pigment composition above-described in water, wherein the average particle diameter of the pigment is between 10 and 300 nm.

In the case that the water-soluble resin has an acid group and is soluble in water in the presence of an alkali, there is also provided an aqueous pigment dispersion produced by dispersing the pigment composition in water in the presence of an alkali, wherein the average particle diameter of the pigment is between 10 and 300 nm.

It is preferable that the pigment is treated under heat in the presence of the surfactant and the water-soluble resin simultaneously when the dry-milling is carried out.

It is further preferable that the pigment is treated under heat at temperatures between 30 and 150° C. simultaneously when said dry-milling is carried out.

From another aspect of the present invention, there is provided a method for producing a pigment composition in a powder form, said method comprising the steps of: (a) dry-milling a pigment in the presence of a surfactant and an water-soluble resin to obtain a milled substance, the surfactant and the water-soluble resin being contained in amounts of 1 to 20% by weight and 2 to 50% by weight respectively based on an amount of said pigment; and, (b) treating under heat the pigment simultaneously with the dry-milling and/or the milled substance after the dry-milling.

In the method, said pigment is preferably treated under heat at temperatures between 30 and 150° C. simultaneously when said dry-milling is carried out.

Alternatively or further, the milled substance may be treated under heat at temperatures between 50 and 150° C. after said dry-milling is carried out.

The dry-milling may be performed using a milling apparatus selected from the group consisting of an attritor, a ball mill, and a vibrating mill.

In the method, the dry-milling can be performed in the absence of any water-soluble inorganic salts.

Further, the dry-milling step may comprises the following sub-steps of: (1) dry-milling said pigment in the presence of said water-soluble resin and in the absence of said surfactant to prepare an intermediate milled substance; and consecutively, (2) further dry-milling said intermediate milled substance after said surfactant is added to said intermediate milled substance to obtain said milled substance.

In the method, said surfactant is preferably an aromatic compound to which an ethylene oxide is added.

Also in the method, said water-soluble resin preferably has an acid group and is soluble in water in the presence of an alkali.

It is further preferable that said water-soluble resin is a solid resin.

The pigment may be a crude pigment.

The pigment is preferably a condensed polycyclic pigment, and the condensed polycyclic pigment preferably comprises a copper phthalocyanine.

In the present method, the pigment composition may be for preparing an aqueous pigment dispersion.

From still another aspect of the present invention, there is provided a method for preparing an aqueous pigment dispersion comprising a step of dispersing the pigment composition produced by the above-disclosed method in water.

In the method above, said dispersion in water is preferably performed in the presence of an alkali.

In the pigment composition of the subject invention, the pigment preferably has particle surfaces thereof coated with the surfactant and the water-soluble resin and has an average particle diameter of 10–300 nm.

The invention can provide, at low production costs, a pigment composition which has the same or more excellent quality compared with pigment compositions produced by a solvent salt milling method which is commonly used in these days. The present invention can also provide an aqueous pigment dispersion from the pigment composition according to the present invention with ease at low costs.

Examples of aqueous pigment dispersions using the pigment composition prepared by the method of the present invention include aqueous paints, textile printing agents, water-based ink, ink for ink jets, and dispersion liquids for color filters. However, the aqueous pigment dispersion according to the present invention is not limited to these applications.

DETAILED DESCRIPTION OF THE INVENTION

In the present invention, inorganic salts are not used at all in dry-milling step but an water-soluble resin is used together with a surfactant instead to conduct dry-milling. This intends to obtain sizes and shapes of primary pigment particles proper for a colorant and also to realize sufficient wetting and adsorption of the resin to the surface of pigment particles at the same time in this milling step. In the presence of the surfactant, the surfactant produces a surface treating effect on the surface of the pigment particles to improve the hydrophilic properties of the surface thereby significantly improving the affinity of the pigment particles to the resin. Wetting and adsorption of the resin to the surface of pigment particles sufficiently proceed by the aid of small energy already in this milling step. Thus, after the dry milling step the pigment is well-wetted and the surface of the particles will be almost entirely coated with the resin. Because of this, coagulation force between pigment particles is very weaken, which will make it very easy to carry out a dispersion operation for the preparation of the aqueous pigment dispersion therefrom.

In the present invention, it is desirable that, unlike conventional methods, solvent treatment be not performed after the milling step, but heat treatment be performed instead during or after the aforementioned dry milling step. This heat treatment enables it possible to rationalize the structure such as size, shape, and crystal structure of the pigment particles without using a solvent and to finely control the hue and tinting strength required for the colorant.

Because the present invention adopts such a manufacturing process as above-mentioned, unlike conventional methods, large amounts of water and solvent are not used and a pigment composition which can be produced in a single step and easily dispersed in an aqueous system can be obtained. An aqueous pigment dispersion is easily obtainable by introducing this pigment composition into alkali-containing water followed by stirring. The above-mentioned production method of the present invention ensures that this aqueous pigment dispersion becomes an aqueous coloring material such as aqueous ink, which has excellent dispersibility, tinting strength, gloss, and flow characteristics.

Particularly preferred pigments adaptable to the present invention are, though not specifically limited to, crude pigments composed of condensed polycyclic compounds such as phthalocyanine pigments, quinacridone pigments, and dioxazine pigments. The "crude pigments" is generally those lacking in properties required for a colorant because of inferior color development and having a particle diameter of 10 to 60 $\mu$m. Alternatively, in the present invention, commercially available pigments composed of pigment particles with an average particle diameter of about 0.3 to 0.5 $\mu$m may be used as the raw materials to be milled. In this case, the average particle diameter of the resulting milled pigment is about 0.01 to 0.03 $\mu$m.

Any surfactant may be used as the surfactant used in the present invention insofar as it has the capability of producing a surface treating effect on the surface of pigment particles to improve hydrophilic property of the surface thereby significantly improving the affinity of the pigment particles to a resin. Among these surfactants, preferably used are those having functional parts including a hydrophilic part to which 4–40 mols of an alkylene oxide such as ethylene oxide are added and a hydrophobic part comprised of a substituted or non-substituted aromatic ring such as benzene, naphthalene, anthracene, or biphenyl. Examples of those surfactants include polyoxyethylenealkylphenyl ether, polyoxyethylenesulfonic acid alkylphenyl ether, polyoxyethylenenaphthyloxy ether, and polyoxyethylenesulfonic acid naphthyloxy ether.

The amount of the surfactant is 1 to 20% by weight and preferably 2 to 12% by weight based on the amount of the pigment. An amount greater than the upper limit of the above defined range is undesirable because the powder form of the pigment composition cannot be maintained in a dry milling apparatus, which causes the composition sticking inside the milling apparatus. On the other hand, an amount lower than the lower limit of the above defined range is also undesirable because the pigment composition, when preparing an aqueous dispersion, is neither resolved nor dispersed in water, but exists as a pigment aggregate and dose not develop any color.

The water-soluble resins usable in the present invention may be those which can sufficiently coat and adhere to the surface of the pigment particles and are the same type as or compatible with a binder and/or a vehicle resin added to the aqueous pigment dispersion and/or intermediately produced concentrates. Particularly, resins which have a solid form and are not such a type that is melted and softened during the heat treatment conducted simultaneously with or after the dry-milling whereby the milled substance are stuck each other are preferable. Water-soluble resins having an acid group such as a carboxyl group or a sulfonic group are preferable.

Specific examples of the water-soluble resins having a carboxyl group include acrylic resins, acryl/styrene copolymers, acryl-α-methylstyrene copolymers, maleic acid resins, and maleic acid/styrene copolymers. These resins contain a monomer component, such as acrylic acid, methacrylic acid, maleic acid, itaconic acid, or partially esterified maleic acid, which is soluble in water in the presence of an alkali component. Examples of the water-soluble resin having sulfonic acid include resins using, as a part of monomers, acryl-3-sulfopropylester, methacryl-3-sulfopropylester, styrenesulfonic acid, or the like. Other than the above examples usable as the resin in the present invention, any other resin which can introduce an acid group by copolymerization may be used. Resins which are modified to incorporate a carboxyl group or a sulfonic group may be used as the water-soluble resin of the present invention. It is operationally desirable that the water-soluble resin blended in the milling step have a pellet form.

The water-soluble resin is used in an amount of 2 to 50% by weight and preferably 5 to 20% by weight based on the amount of the pigment. If the amount of the water-soluble resin is above the upper limit of the above range, the type and amount of vehicle resin which must constitute the aqueous dispersion are restricted by the resin which has been already used in the pigment composition of the present invention. Such an amount is therefore undesirable. An amount less than the lower limit of the above range is undesirable because no coagulation inhibitive effect on the pigment particles can be produced in the dry milling step and hence the pigment particles are not resolved resulting in inferior color development.

In the present invention, the pigment may be milled in a dry condition using a milling apparatus with a built-in milling media, e.g. beads, while maintaining a powder form. The milling operation is carried out by making use of milling force or breaking force due to the mutual collapse between media without adding an water-soluble inorganic salt as a milling adjuvant. Water and an aqueous solvent may be added in the dry milling step to the extent that the pigment can keep a powder form. As the milling apparatus, a well-known apparatus, such as a dry attritor, ball mill, and vibrating mill, may be used. In particular, an attritor is preferable in view of production efficiency.

In this invention, preferably heat treatment is further carried out. With this heat treatment of the pigment composition, the size, shape, and crystal structure of the dispersed particles can be controlled. Stated another way, the size and shape of dispersed particles of the pigment are well-regulated whereby the hue and the tinting strength can be modulated. Furthermore, some pigments comprised of a polycyclic compound have some different crystal types and differs in the hue and the tinting strength depending on the structure. For example, a copper phthalocyanine pigment has some different crystal structures. The hue is reddish in the case of α-type crystal structure and greenish in the case of β-type crystal structure. Because a mutual equilibrium relation is established between these crystal structures and these structures are mutually transformed by energy, for example, heat, the crystal structure of the pigment can be altered by heat treatment. In the method for producing the pigment composition of the present invention, heat treatment is performed during or after the dry milling. The heat treatments may be performed both during and after the dry milling.

Preferably the dry milling is performed typically at temperatures ranging from 30 to 150° C. in light of the aforementioned function and effect. The milling temperature is properly set corresponding to the milling apparatus to be used. If the milling temperature is higher than the softening point of the resin to be used, sticking of resin is caused inside the dry-milling apparatus. Therefore the milling temperature must be designed to be possibly lower than the softening point of the resin to be used. The milling time, though differs depending on the type of milling apparatus, is typically 10 minutes to 6 hours. When the milling time is short, the shape and size of the dispersed pigment particles are made ununiform because the pigment is insufficiently milled. It is also undesirable to continue a milling operation for a long period of time in view of the production efficiency.

Any type of apparatus for heat treatment may be used as the apparatus for heat treatment after the dry milling as long as it is an apparatus, e.g. a box-type dryer and a band dryer, which is capable of heat-treating. The temperature and time for heat treatment after the dry milling are properly designed according to the objective pigment composition, and, specifically may be properly designed corresponding to a desired size, shape, and crystal structure of the pigment particles. However, a low temperature requires long treating time whereas a high temperature requires large energy. Preferably the temperature is therefore typically from 50 to 150° C.

The pigment composition of the present invention is in the form of a fluid powder, in which the surface of the pigment particles is coated with the surfactant and resin. The particle diameter of the powder is in a range from 5 to 100 $\mu$m. The diameter of pigment particles when this powder is dispersed in water can be controlled by the conditions of the dry milling step and heat treatment step and is generally from 0.01 to 0.3 $\mu$m, which is the same level as the pigment particles prepared by the conventional solvent salt milling method.

The pigment composition according to the present invention is easily resolved and dispersed in water in the presence of an alkali such as an alkaline metal, amine, and ammonia to be made into an aqueous pigment dispersion. A vehicle resin for the aqueous pigment dispersion may be further present in the water. Furthermore, a method may be adopted in which the pigment composition of the present invention is once dispersed in water containing an alkali to prepare a concentrated dispersion and the concentrated dispersion is then dispersed in a vehicle for the final product which contains a binder resin. The amount of the alkali is 1.0 to 1.4 equivalents to the acid group contained in the used resin.

EXAMPLES

The present invention will be explained in detail by way of examples as follows.

The standard referred to in the following Examples 1–6 and Comparative Examples 1 and 2 is the one obtained in the following Comparative Example 3. The pigment used in the Comparative Example 3 was prepared by using a solvent salt milling method for pigmentation of crude pigments.

The crystal types of pigment were measured using an X-ray diffractometer. The size and form of particles were observed using a transmission-type electron microscope. The α-type crystallinity, average diameter of dispersed particles, and dispersion stability of a copper phthalocyanine pigment concentrated dispersion were evaluated according to the following methods.

1) α-type crystallinity

The crystal type was measured using a RINT 1000 X-ray Diffractometer (manufactured by Rigaku Co.,LTD.). The content of α-type crystal was calculated from the integrated intensity at the peak position.

2) Average diameter of dispersed particles

In Examples 1–6 and Comparative Examples 1 and 2, the average particle diameter was measured using an electron microscope. In Examples 7 to 24, the average particle diameter was measured using a laser diffraction-type size distribution meter (Micro track UPA, manufactured by Leeds and Northrup Co., Ltd.).

3) Dispersion stability

A 50 ml lidded screw tube was charged with 30 ml of the concentrated dispersion to evaluate the precipitation characteristic after the dispersion was allowed to stand at 50° C. for one week. In the table, ⊙ indicates that there was no precipitation, ○ indicates that the height of a precipitate was less than 0.5 mm, and Δ indicates that the height of a precipitate was greater than 5 mm.

4) Tinting strength and hue

The tinting strength and hue were analyzed using an 80 Color Measuring System (manufactured by Nippon Denshoku Co.,LTD.) after painting using the inks prepared in each of the examples and comparative examples so as to have the same pigment content and measuring the color using an SZ Optical Sensor (manufactured by Nippon Denshoku Co.,LTD.).

Example 1

A dry attritor was charged with 70 parts by weight of crude copper phthalocyanine and 30 parts by weight of an acrylic resin (Johncryl J-679, manufactured by Johnson Polymer Co., Ltd.) and the mixture was milled in a dry condition at 120° C. for 30 minutes. Next, to this milled substance was added 8 parts by weight of a nonionic surfactant (Newcol B13, manufactured by Nippon Nyukazai Co.,LTD.) and the resulting mixture was further milled in a dry condition at 120° C. for 15 minutes to obtain a pigment composition. The content of α-type crystal in the resulting pigment composition was 10 wt % or less.

10 parts by weight of the resulting pigment composition was dissolved in 10 parts by weight of ion-exchanged water containing a vehicle resin by addition of 1.6 parts by weight of an aqueous 25% sodium hydroxide solution. The mixture was moderately stirred at room temperature to obtain a concentrated dispersion. 400 parts by weight of an aqueous paint vehicle (Highlight 700, manufactured by Dai Nippon Toryo Co., Ltd.) was then added to the resulting concentrated dispersion to prepare a final pigment dispersion.

The resulting aqueous pigment dispersion was compared with the standard containing a pigment in the same amount. The pigment dispersion prepared in this example was superior to the standard in tinting strength, gloss, and hue. In particular, the tinting strength of the ink prepared in this example was about 140%. The average particle diameter of pigment particles dispersed in the ink was 50 to 100 nm.

Comparative Example 1

A dry attritor was charged with 70 parts by weight of crude copper phthalocyanine and 30 parts by weight of an acrylic resin (Johncryl J-679, manufactured by Johnson Polymer Co., Ltd.) and the mixture was milled in a dry condition at 120° C. for 30 minutes. 10 parts by weight of the resulting pigment composition was dissolved in 10 parts by weight of ion-exchanged water containing a vehicle resin by addition of 1.6 parts by weight of an aqueous 25% sodium hydroxide solution. The mixture was moderately stirred at room temperature to obtain a concentrated dispersion. An occurrence of sedimentation was observed in the resulting pigment dispersion concentrate. 400 parts by weight of an aqueous paint vehicle (Highlight 700) was then added to the resulting concentrated dispersion to prepare a final pigment dispersion.

The resulting pigment dispersion was compared with the standard containing a pigment in the same amount. The pigment dispersion prepared in this comparative example was considerably inferior in the quality.

Comparative Example 2

A dry attritor was charged with 70 parts by weight of crude copper phthalocyanine and 10 parts by weight of a nonionic surfactant (Newcol B13, manufactured by Nippon Nyukazai Co.,LTD.) and the mixture was milled in a dry condition at 120° C. for 30 minutes. Next, 10 parts by weight of ion-exchanged water was added to 10 parts by weight of the resulting pigment composition and the resulting mixture was moderately stirred to obtain a concentrated dispersion. 400 parts by weight of an aqueous paint vehicle (Highlight 700) was then added to the resulting concentrated dispersion to prepare a final pigment dispersion.

The resulting pigment dispersion was compared with the standard containing a pigment in the same amount. The pigment dispersion developed an unclear color and the tinting strength was about 70%.

Comparative Example 3

70 parts by weight of a copper phthalocyanine pigment (FG7330, manufactured by Toyo Ink Mfg. Co., Ltd.), 30 parts by weight of acrylic resin (Johncryl J-679, manufactured by Johnson Polymer Co., Ltd.), 8 parts by weight of a nonionic surfactant (Newcol B13, manufactured by Nippon Nyukazai Co.,LTD.), and 1.6 parts by weight of an aqueous 25% sodium hydroxide solution were placed in mayonnaise bottle. The mixture was dispersed for 2 hours using a paint conditioner to produce a concentrated dispersion.

After that, 400 parts by weight of an aqueous paint vehicle (Highlight 700) was then added to the resulting concentrated dispersion to prepare a final pigment dispersion.

Example 2

A dry attritor was charged with 70 parts by weight of crude copper phthalocyanine and 30 parts by weight of an acrylic resin (Johncryl J-68, manufactured by Johnson Polymer Co., Ltd.) and the mixture was milled in a dry condition at 50° C. for 30 minutes. Next, to this milled substance was added 8 parts by weight of a nonionic surfactant (Newcol B13, manufactured by Nippon Nyukazai Co.,LTD.) and the resulting mixture was further milled in a dry condition at 50° C. for 15 minutes. The content of α-type crystal in the resulting pigment composition was about 55 wt %.

Then, a concentrated dispersion was obtained in the same manner as in Example 1. 400 parts by weight of an aqueous paint vehicle (Highlight 700) was then added to the resulting concentrated dispersion to prepare a final pigment dispersion.

The resulting pigment dispersion was compared with the standard containing a pigment in the same amount. The pigment dispersion prepared in this example had a tinting strength of about 140% and the hue had a reddish grade. The average particle diameter of the pigment dispersed in the pigment dispersion was 20 to 50 nm.

Example 3

A dry attritor was charged with 70 parts by weight of crude copper phthalocyanine and 10 parts by weight of an acrylic resin (Johncryl J-679, manufactured by Johnson Polymer Co., Ltd.) and the mixture was milled in a dry condition at 50° C. for 30 minutes. To this milled substance was added 3.5 parts by weight of a nonionic surfactant (Newcol B13, manufactured by Nippon Nyukazai Co.,LTD.) and the resulting mixture was further milled in a dry condition at 50° C. for 15 minutes. The milled product was treated under heat at 120° C. for 24 hours. The content of α-type crystal in the resulting pigment composition was 1 wt % or less.

Then, a concentrated dispersion was obtained in the same manner as in Example 1. 400 parts by weight of an aqueous paint vehicle (Highlight 700) was then added to the resulting concentrated dispersion to prepare a final pigment dispersion.

The resulting pigment dispersion was compared with the standard containing a pigment in the same amount. The pigment dispersion prepared in this example had the same tinting strength as the standard and the hue had a slightly reddish grade. The average particle diameter of the pigment dispersed in the ink was 100 to 200 nm. The pigment particles had a acicular form.

Example 4

A dry attritor was charged with 70 parts by weight of crude copper phthalocyanine and 10 parts by weight of an acrylic resin (Johncryl J-679, manufactured by Johnson Polymer Co., Ltd.) and the mixture was milled in a dry condition at 120° C. for 30 minutes. To this milled substance was added 8 parts by weight of a nonionic surfactant (Newcol B4SN, manufactured by Nippon Nyukazai Co., LTD.) and the resulting mixture was further milled in a dry condition at 50° C. for 120 minutes. The content of α-type crystal in the resulting pigment composition was about 20 wt %.

Then, a concentrated dispersion was obtained in the same manner as in Example 1. 400 parts by weight of an aqueous paint vehicle (Highlight 700) was then added to the resulting concentrated dispersion to prepare a final pigment dispersion.

The resulting aqueous pigment dispersion was compared with the standard containing a pigment in the same amount. The pigment dispersion prepared in this example was almost the same as the standard in tinting strength, hue, and gloss.

Example 5

A dry attritor was charged with 70 parts by weight of crude copper phthalocyanine and 10 parts by weight of an acrylic resin (Johncryl J-679, manufactured by Johnson Polymer Co., Ltd.) and the mixture was milled in a dry condition at 120° C. for 30 minutes. To this milled substance was added 8 parts by weight of a nonionic surfactant (Newcol B4SN, manufactured by Nippon Nyukazai Co., LTD.) and the resulting mixture was further milled in a dry condition at 120° C. for 15 minutes. The content of α-type crystal in the resulting pigment composition was about 30 wt %.

Then, a concentrated dispersion was obtained in the same manner as in Example 1. 400 parts by weight of an aqueous paint vehicle (Highlight 700) was then added to the resulting concentrated dispersion to prepare a final pigment dispersion.

The resulting aqueous pigment dispersion was compared with the standard containing a pigment in the same amount. The pigment dispersion prepared in this example was almost the same as the standard in tinting strength, hue, and gloss.

Example 6

A dry attritor was charged with 70 parts by weight of crude copper phthalocyanine and 10 parts by weight of an acrylic resin (Johncryl HPD-671, manufactured by Johnson Polymer Co., Ltd.) and the mixture was milled in a dry condition at 120° C. for 30 minutes. To this milled substance was added 8 parts by weight of a nonionic surfactant (Newcol B13, manufactured by Nippon Nyukazai Co.,LTD.) and the resulting mixture was further milled in a dry condition at 120° C. for 15 minutes. The content of α-type crystal in the resulting pigment composition was about 30 wt %.

Then, a concentrated dispersion was obtained in the same manner as in Example 1. 400 parts by weight of an aqueous paint vehicle (Highlight 700) was then added to the resulting concentrated dispersion to prepare a final pigment dispersion.

The resulting aqueous pigment dispersion was compared with the standard containing a pigment in the same amount. The pigment dispersion prepared in this example was almost the same as the standard in tinting strength, hue, and gloss.

The results of the α-type crystallinity, average particle diameter and measured color of the final pigment dispersion prepared in Examples 1 to 6 and Comparative Examples 1 to 3 are shown in Table 1.

TABLE 1

| Ex. No. | Pigment (g) | Resin (g) | Surfactant (g) | Dry-milling Time (min) | Dry-milling Temp (° C.) | Heat Treatment (hours) | α-type crystallinity (%) | Average particle diameter (nm) | L* | a* | b* |
|---|---|---|---|---|---|---|---|---|---|---|---|
| 1 | P1 = 70 | R1 = 30 | S1 = 8 | 45 | 120 | | 9 | 50~100 | 56.65 | −4.27 | −38.00 |
| 2 | P1 = 70 | R4 = 30 | S1 = 8 | 45 | 50 | | 55 | 20~50 | 55.40 | −1.33 | −39.21 |
| 3 | P1 = 70 | R1 = 10 | S1 = 3.5 | 45 | 50 | 24 | <1 | 100~200 | 58.72 | −5.54 | −36.53 |
| 4 | P1 = 70 | R1 = 10 | S2 = 8 | * | | | 20 | 50~100 | 58.05 | −5.14 | −37.19 |
| 5 | P1 = 70 | R1 = 10 | S2 = 8 | 45 | 50 | | 30 | 50~100 | 58.86 | −6.31 | −36.19 |
| 6 | P1 = 70 | R5 = 10 | S1 = 8 | 45 | 120 | | 30 | 50~100 | 57.39 | −4.20 | −37.43 |
| C. 1 | P1 = 70 | R1 = 30 | | 30 | 120 | | 50 | | 80.66 | −4.37 | −12.83 |

TABLE 1-continued

| Ex. No. | Pigment (g) | Resin (g) | Surfactant (g) | Dry-milling Time (min) | Dry-milling Temp (° C.) | Heat Treatment (hours) | α-type crystallinity (%) | Average particle diameter (nm) | L* | a* | b* |
|---|---|---|---|---|---|---|---|---|---|---|---|
| C. 2 | P1 = 70 | | S1 = 10 | 30 | 120 | | <1 | | 60.88 | −4.84 | −32.50 |
| C. 3 | P4 = 70 | R1 = 30 | S1 = 8 | | | | <1 | 50~100 | 59.20 | −5.11 | −37.01 |

*Dry-milling was carried out at 120° C. for 30 minutes and at 50° C. for 120 minutes.

Example 7

A dry attritor was charged with 70 parts by weight of crude copper phthalocyanine and 10 parts by weight of an acrylic resin (Johncryl J-679, manufactured by Johnson Polymer Co., Ltd.) and the mixture was milled at 120° C. for 30 minutes. To this milled substance was added 8 parts by weight of a nonionic surfactant (Newcol B13, manufactured by Nippon Nyukazai Co.,LTD.) and the resulting mixture was further milled at 120° C. for 15 minutes. The content of α-type crystal in the resulting pigment composition was about 10 wt % or less.

10 parts by weight of the resulting pigment composition was dispersed in 10 parts by weight of ion-exchanged water containing a resin by addition of 1.6 parts by weight of an aqueous 25% sodium hydroxide solution. This mixture was moderately stirred at room temperature to obtain a concentrated dispersion.

An ink jet binder composition consisting of the following components was added to 5 parts by weight of the resulting concentrated dispersion. These components were mixed and stirred, and then filtered through 3.00 μm filter to obtain an ink jet ink.

| | |
|---|---|
| 1,3-propane diol | 10 parts by weight |
| Glycerol | 5 parts by weight |
| Acrylic resin emulsion | 0.2 parts by weight |
| mildewicide | 0.05 parts by weight |
| Ion-exchanged water | 79.75 parts by weight |

Comparative Example 4

70 parts by weight of a copper phthalocyanine pigment (FG7351, manufactured by Toyo Ink Mfg. Co., Ltd.), 30 parts by weight of an acrylic resin (Johncryl J-679, manufactured by Johnson Polymer Co., Ltd.), 8 parts by weight of a nonionic surfactant (Newcol B13, manufactured by Nippon Nyukazai Co.,LTD.), and 1.6 parts by weight of an aqueous 25% sodium hydroxide solution were placed in mayonnaise bottle. The mixture was dispersed for 2 hours using a paint conditioner to produce a concentrated dispersion.

The same ink jet binder composition as in Example 7 was added in the same amount to 5 parts by weight of the resulting concentrated dispersion. These components were mixed and stirred, and then filtered through 3.00 μm filter to obtain an ink jet ink.

Examples 8–14

Ink jet inks of Examples 8 to 14 were prepared in the same manner as in Example 7 except that only the types and amounts of pigment, resin, and surfactant and dry milling conditions were altered. Also, in Examples 8 and 10, heat treatment was further carried out at 120° C. for 12 hours after dry milling was completed.

Table 2 shows the α-type crystallinity, average diameter of dispersed particles, and dispersibility of the concentrated dispersions prepared in Examples 7 to 14 and Comparative Example 4 prior to addition of an ink jet binder component and filtration.

TABLE 2

| Ex. No. | Pigment (g) | Resin (g) | Surfactant (g) | Dry-milling Time (min) | Dry-milling Temp (° C.) | Heat Treatment (hours) | α-type crystallinity (%) | Average particle diameter (nm) | Dispersion Stability |
|---|---|---|---|---|---|---|---|---|---|
| 7 | P1 = 70 | R1 = 10 | S1 = 8 | 45 | 120 | | 9 | 77 | ◉ |
| 8 | P1 = 70 | R1 = 10 | S1 = 8 | 45 | 120 | 12 | <1 | 206 | ◉ |
| 9 | P1 = 70 | R1 = 5 | S1 = 8 | 45 | 50 | | 56 | 181 | ◉ |
| 10 | P1 = 70 | R1 = 5 | S1 = 8 | 45 | 50 | 12 | <1 | 240 | ◉ |
| 11 | P1 = 70 | R2 = 10 | S1 = 8 | 60 | 50 | | 62 | 226 | ○ |
| 12 | P1 = 70 | R3 = 10 | S1 = 8 | 60 | 50 | | 47 | 121 | ◉ |
| 13 | P2 = 70 | R1 = 30 | S1 = 8 | 60 | 130 | | | 185 | ○ |
| 14 | P3 = 70 | R1 = 30 | S1 = 8 | 60 | 120 | | | 85 | ◉ |
| C. 4 | P5 = 70 | R1 = 30 | S1 = 8 | | | | <1 | 100 | ◉ |

The details of the types of the pigments P1–P5, resins R1–R5, and surfactants S1–S4 are as follows:

Pigment

P1: Crude copper phthalocyanine (manufactured by Kawasaki Kasei Chemicals, Ltd.)

P2: Crude dimethylquinacridone (manufactured by Francolor Pigment Co.,Ltd.)

P3: Crude carbazole Dioxazine Violet (manufactured by Sumitomo Chemical Co., Ltd.)

P4: Copper phthalocyanine pigment (FG7330, manufactured by Toyo Ink Mfg. Co., Ltd.)

P5: Copper phthalocyanine pigment (FG7351, manufactured by Toyo Ink Mfg. Co., Ltd.)

Resin

R1: J679 (manufactured by Johnson Polymer Co., Ltd.) (styrene-acryl copolymer, acid value: 200, Tg=85° C., Mw=7,000)

R2: SMA1440 (manufactured by Elf Atochem Co.,Ltd.) (styrene-partially esterified maleic acid copolymer, acid value=185, Tg=44° C., Mw=6,700)

R3: SMA2625 (manufactured by Elf Atochem Co.,Ltd.) (styrene-partially esterified maleic acid copolymer, acid value=220, Tg=110° C., Mw=7,500)

R4: HPD671 (manufactured by Johnson Polymer Co., Ltd.)(styrene-acryl copolymer, acid value=214, Tg=128° C., Mw=17,250)

R5: J68 (manufactured by Johnson Polymer Co., Ltd.) (styrene-acryl copolymer, acid value=195, Tg=70° C., Mw=10,000)

Surfactant

S1: Newcol B13 (manufactured by Nippon Nyukazai Co.,Ltd.)(naphthalene-ethylene oxide-type nonionic surfactant)

S2: Newcol B4SN (manufactured by Nippon Nyukazai Co.,Ltd.)(naphthalene-ethylene oxide-type anionic surfactant)

S3: Newcol 723 (manufactured by Nippon Nyukazai Co.,Ltd.)(styrylbenzyl-ethylene oxide-type nonionic surfactant)

S4: Newcol 560 (manufactured by Nippon Nyukazai Co.,Ltd.)(alkylphenyl-ethylene oxide-type nonionic surfactant)

Printing was made on copy paper by using a commercially available piezo-type printer and the ink jet inks prepared in Examples 7 to 14 and Comparative Example 4. The results of color strength and hue are shown in Table 3.

The compound comprising the resulting concentrated dispersion, an activator, additives, and an water-soluble resin was mixed with an emulsion varnish containing additives, a mildewicide, and the like while stirring to produce an aqueous gravure ink.

The hue and the tinting strength were evaluated by applying, to coated paper, an ink composition produced by mixing 2 parts by weight of the produced aqueous gravure ink with 20 parts by weight of Aquaconte G65 White (manufactured by Toyo Ink Mfg. Co., Ltd.) and by measuring the printed color.

Comparative Example 5

70 parts by weight of a copper phthalocyanine pigment (FG7330, manufactured by Toyo Ink Mfg. Co., Ltd.), 30 parts by weight of acrylic resin (Johncryl J-679, manufactured by Johnson Polymer Co., Ltd.), 8 parts by weight of a nonionic surfactant (Newcol B13, manufactured by Nippon Nyukazai Co.,Ltd.), 1.6 parts by weight of an aqueous 25% sodium hydroxide solution, and 1 part by weight of ethylene glycol were placed in mayonnaise bottle. The mixture was dispersed for 2 hours using a paint conditioner to produce a concentrated dispersion.

The compound comprising the resulting concentrated dispersion, an activator, additives, and an water-soluble resin was mixed with an emulsion varnish containing additives, a mildewicide, and the like while stirring to produce an aqueous gravure ink.

The hue and the tinting strength were evaluated by applying, to coated paper, an ink composition produced by

TABLE 3

| Ex. No. | Pigment (g) | Resin (g) | Surfactant (g) | Surface tension (mN/m) | Viscosity (cPs) | L* | a* | b* |
| --- | --- | --- | --- | --- | --- | --- | --- | --- |
| 7 | P1 = 70 | R1 = 10 | S1 = 8 | 29.7 | 1.88 | 54.80 | −2.40 | −42.10 |
| 8 | P1 = 70 | R1 = 10 | S1 = 8 | 26.5 | 1.81 | 59.07 | −5.50 | −40.21 |
| 9 | P1 = 70 | R1 = 5 | S1 = 8 | 26.5 | 1.82 | 61.28 | −7.94 | −36.78 |
| 10 | P1 = 70 | R1 = 5 | S1 = 8 | 26.6 | 1.67 | 59.64 | −3.53 | −38.63 |
| 11 | P1 = 70 | R2 = 10 | S1 = 8 | 26.7 | 2.08 | 59.07 | −5.50 | −40.21 |
| 12 | P1 = 70 | R3 = 10 | S1 = 8 | 26.3 | 1.89 | 57.10 | −6.11 | −40.10 |
| 13 | P2 = 70 | R1 = 30 | S1 = 8 | 26.5 | 1.89 | 58.30 | 44.77 | −7.83 |
| 14 | P3 = 70 | R1 = 30 | S1 = 8 | 26.3 | 1.97 | 42.40 | 26.08 | −29.93 |
| C. 4 | P5 = 70 | R1 = 30 | S1 = 8 | 26.5 | 1.95 | 59.47 | −7.25 | −38.31 |

Example 15

A dry attritor was charged with 70 parts by weight of crude copper phthalocyanine and 10 parts by weight of an acrylic resin (Johncryl J-679, manufactured by Johnson Polymer Co., Ltd.) and the mixture was milled in a dry condition at 120° C. for 30 minutes. Next, to this milled substance was added 8 parts by weight of a nonionic surfactant (Newcol B13, manufactured by Nippon Nyukazai Co.,Ltd.) and the resulting mixture was further milled in a dry condition at 120° C. for 15 minutes. The content of α-type crystal in the resulting pigment composition was 10 wt % or less.

10 parts by weight of the resulting pigment composition was dispersed in 10 parts by weight of ion-exchanged water containing a resin by addition of 1.6 parts by weight of an aqueous 25% sodium hydroxide solution and 1 part by weight of ethylene glycol. The mixture was moderately stirred at room temperature to obtain a concentrated dispersion.

mixing 2 parts by weight of the produced aqueous gravure ink with 20 parts by weight of Aquaconte G65 White (manufactured by Toyo Ink Mfg. Ltd.) and by measuring the printed color.

Examples 16–19

Aqueous gravure inks of Examples 16 to 19 were prepared in the same manner as in Example 15 except that only the type of surfactant and the dry milling condition were altered. Also, in Examples 16 and 18, heat treatment was further carried out at 120° C. for 12 hours after dry milling was completed. The results of the color strength and hue are shown in Table 4.

TABLE 4

| Ex. No. | Pigment (g) | Resin (g) | Surfactant (g) | Dry-milling Time (min) | Dry-milling Temp (° C.) | Heat Treatment (hours) | α-type crystallinity (%) | L* | a* | b* |
|---|---|---|---|---|---|---|---|---|---|---|
| 15 | P1 = 70 | R1 = 10 | S1 = 8 | 45 | 120 |  | 9 | 58.10 | −6.92 | −36.00 |
| 16 | P1 = 70 | R1 = 10 | S2 = 8 | 45 | 120 | 12 | 25 | 57.26 | −2.68 | −35.28 |
| 17 | P1 = 70 | R1 = 10 | S3 = 8 | 45 | 50 |  | 42 | 56.86 | −1.57 | −36.05 |
| 18 | P1 = 70 | R1 = 10 | S4 = 8 | 45 | 50 | 12 | 51 | 56.27 | −1.68 | −36.67 |
| 19 | P1 = 70 | R1 = 10 | S1 = 8 | 60 | 50 |  | 1 | 58.61 | −5.59 | −34.26 |
| C. 5 | P4 = 70 | R1 = 30 | S1 = 8 |  |  |  |  | 59.25 | −6.84 | −35.11 |

What is claimed is:

1. A pigment composition in a powder form produced by dry-milling a pigment in the presence of a surfactant and a water-soluble resin, said surfactant and said water-soluble resin being contained in amounts of 1 to 20% by weight and 2 to 50% by weight respectively based on an amount of the pigment,
   wherein the surfactant has a property of improving the affinity of the pigment and the water-soluble resin,
   wherein the water-soluble resin has a property of coating and adhering to the surface of the pigment, and
   wherein the pigment has a property of being dry-millable.

2. The pigment composition according to claim 1, wherein said surfactant is an aromatic compound to which an ethylene oxide is added.

3. The pigment composition according to claim 1, wherein said water-soluble resin has an acid group and is soluble in water in the presence of an alkali.

4. The pigment composition according to claim 1, wherein said water-soluble resin is a solid resin.

5. The pigment composition according to claim 1, wherein said pigment is a crude pigment.

6. The pigment composition according to claim 1, wherein said pigment is a condensed polycyclic pigment.

7. The pigment composition according to claim 6, wherein said condensed polycyclic pigment comprises a copper phthalocyanine.

8. The pigment composition according to claim 1, wherein the pigment has particle surfaces thereof coated with the surfactant and the water-soluble resin and has an average particle diameter of 10–300 nm.

9. An aqueous pigment dispersion produced by dispersing the pigment composition of claim 1 in water, wherein the pigment has an average particle diameter of between 10 and 300 nm.

10. An aqueous pigment dispersion produced by dispersing the pigment composition of claim 3 in water in the presence of an alkali, wherein the pigment has an average particle diameter of between 10 and 300 nm.

11. The pigment composition according to claim 1, wherein said dry-milling is carried out in the presence of heat.

12. The pigment composition according to claim 11, wherein said pigment is treated under heat at temperatures between 30 and 150° C. simultaneously when said dry-milling is carried out.

13. A method for producing a pigment composition in a powder form, said method comprising the steps of:
   (a) dry-milling a pigment in the presence of a surfactant and a water-soluble resin to obtain a milled substance, the surfactant and the water-soluble resin being contained in amounts of 1 to 20% by weight and 2 to 50% by weight respectively based on an amount of said pigment,
   wherein the surfactant has a property ot improving the affinity of the pigment and the water-soluble resin,
   wherein the water-soluble resin has a property of coating and adhering to the surface of the pigment, and
   wherein the pigment has a property of being dry-millable; and
   (b) carrying, out the dry-milling in the presence of heat, and/or heating the milled substance after the dry-milling.

14. The method according to claim 13, wherein said pigment is treated under heat at temperatures between 30 and 150° C. simultaneously when said dry-milling is carried out.

15. The method according to claim 13, wherein said milled substance is treated under heat at temperatures between 50 and 150° C. after said dry-milling is carried out.

16. The method according to claim 13, wherein said dry-milling is performed using a milling apparatus selected from the group consisting of an attritor, a ball mill, and a vibrating mill.

17. The method according to claim 13, wherein said dry-milling is performed in the absence of any water-soluble inorganic salts.

18. The method according to claim 13, wherein said dry-milling step (a) comprises:
   (1) dry-milling said pigment in the presence of said water-soluble resin and in the absence of said surfactant to prepare an intermediate milled substance; and consecutively,
   (2) further dry-milling said intermediate milled substance after said surfactant is added to said intermediate milled substance to obtain said milled substance.

19. The method according to claim 13, wherein said surfactant is an aromatic compound to which an ethylene oxide is added.

20. The method according to claim 13, wherein said water-soluble resin has an acid group and is soluble in water in the presence of an alkali.

21. The method according to claim 13, wherein said water-soluble resin is a solid resin.

22. The method according to claim 13, wherein said pigment is a crude pigment.

23. The method according to claim 13, wherein said pigment is a condensed polycyclic pigment.

24. The method according to claim 23, wherein said condensed polycyclic pigment comprises a copper phthalocyanine.

25. A method for preparing an aqueous pigment dispersion comprising a step of dispersing the pigment composition produced by the method of claim 13 in water.

26. The method according to claim 25, wherein said dispersion in water is performed in the presence of an alkali.

* * * * *

UNITED STATES PATENT AND TRADEMARK OFFICE
CERTIFICATE OF CORRECTION

PATENT NO. : 6,056,814

DATED : May 2, 2000

INVENTOR(S): Mikiya KATO, et al.

It is certified that an error appears in the above-identified patent and that said Letters Patent is hereby corrected as shown below:

On the title page, item [30], The Foreign Application Priority Data is incorrectly listed. It should read as follows:

--[30] Foreign Application Priority Data

Dec. 8, 1997 [JP] Japan ............P9-336701--

Signed and Sealed this

Third Day of April, 2001

*Attest:*

NICHOLAS P. GODICI

*Attesting Officer*  Acting Director of the United States Patent and Trademark Office